United States Patent [19]
Kubo

[11] Patent Number: 5,850,380
[45] Date of Patent: *Dec. 15, 1998

[54] PHOTOMAGNETIC HEAD APPARATUS

[75] Inventor: Wataru Kubo, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 890,829

[22] Filed: Jul. 10, 1997

Related U.S. Application Data

[63] Continuation of Ser. No. 690,821, Aug. 1, 1996, abandoned.

[30] Foreign Application Priority Data

Aug. 4, 1995 [JP] Japan .................................. 7-199923

[51] Int. Cl.$^6$ .................................................. G11B 7/135
[52] U.S. Cl. ...................... 369/110; 369/112; 369/109; 369/118; 369/44.37
[58] Field of Search .................................. 369/112, 103, 369/110, 109, 100, 44.11, 44.12, 44.14, 44.23, 44.37, 118

[56] References Cited

U.S. PATENT DOCUMENTS

| | | |
|---|---|---|
| 4,951,274 | 8/1990 | Iwanaga et al. . |
| 5,231,620 | 7/1993 | Ohuchida . |
| 5,247,508 | 9/1993 | Tanaka . |
| 5,272,685 | 12/1993 | Ando . |
| 5,278,401 | 1/1994 | Takishima et al. . |
| 5,280,464 | 1/1994 | Itoh et al. . |
| 5,293,371 | 3/1994 | Koyama . |
| 5,293,569 | 3/1994 | Koyama . |
| 5,309,423 | 5/1994 | Noguchi et al. . |
| 5,315,574 | 5/1994 | Saimi et al. . |
| 5,337,300 | 8/1994 | Takishima et al. . |
| 5,453,963 | 9/1995 | Katayama et al. . |
| 5,491,675 | 2/1996 | Kay ...................................... 369/112 X |
| 5,493,555 | 2/1996 | Kimura et al. ....................... 369/112 X |

FOREIGN PATENT DOCUMENTS

| | | |
|---|---|---|
| 0273356 | 7/1988 | European Pat. Off. . |
| 0468800 | 1/1992 | European Pat. Off. . |
| 0539128 | 4/1993 | European Pat. Off. . |
| 0547624 | 6/1993 | European Pat. Off. . |
| 0576072 | 12/1993 | European Pat. Off. . |
| 2192031 | 7/1990 | Japan . |
| 5166237 | 7/1993 | Japan . |
| 5205338 | 8/1993 | Japan . |
| 5290401 | 11/1993 | Japan . |
| 718109 | 2/1995 | Japan . |

OTHER PUBLICATIONS

United Kingdom Search Report of U.K. Patent Application No. 9507188.2.
Patent Abstract of Japan, vol. 18, No. 089 (P-1692).
French Search Report of French Application No. FR 9504092.

Primary Examiner—Muhammad N. Edun
Attorney, Agent, or Firm—Greenblum & Bernstein, P.L.C.

[57] ABSTRACT

A photomagnetic head apparatus includes a beam splitter which splits a laser beam, reflected by concentric recording tracks of a rotating photomagnetic recording disc, into three bundles of rays. The three bundles of rays have different polarization directions in a plane which lies in a radial direction of the recording tracks. One of the three bundles of rays is used as a servo-signal light, and the remaining two bundles of rays are used as data signal lights. A defocusing diffraction element splits at least the servo-signal light into a least two bundles of rays in a direction corresponding to the tangential direction of the recording tracks, substantially perpendicular to the split direction of the beam splitter and which provides at least two split lights with a predetermined amount of positive or negative defocus in an optical axis direction. A pair of servo-signal light receiving elements receive the split beams of the servo-signal light produced by the defocusing diffraction element. A data light receiving element receives the data signal lights. The defocusing diffraction element is made of a non-circular element whose numerical aperture in the tangential direction of the recording tracks is smaller than the numerical aperture in the radial direction.

14 Claims, 16 Drawing Sheets

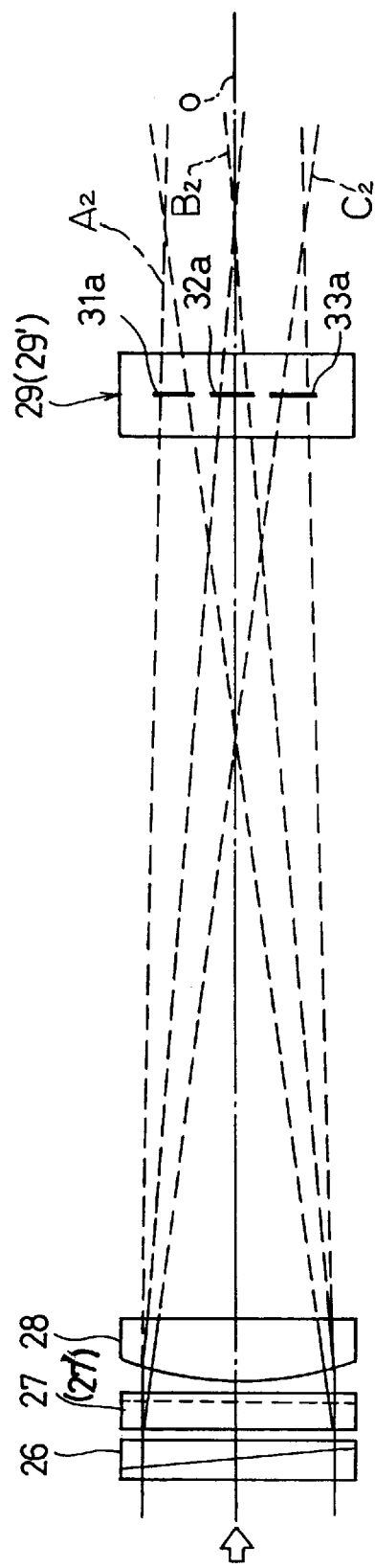

PHOTOMAGNETIC HEAD APPARATUS

This application is a continuation, of application No. 08/690,821, filed Aug. 1, 1996, now abandoned.

BACKGROUND OF THE INVENTION

1. Field of the Invention

The present invention relates to a photomagnetic head apparatus which is adapted to record or reproduce data onto or from a photomagnetic recording disc.

This application is related to commonly assigned application U.S. Ser. No. 418,575, the disclosure of which is expressly incorporated by reference herein.

2. Description of the Related Art

In a known photomagnetic (opto-magnetic) head apparatus, a laser beam reflected by a photomagnetic recording medium, such as an optical disc or an optical card, etc., is split into two beams, namely, one beam for servo-signals and another beam for data signals. If a known spot-size method is applied to such a conventional photomagnetic head apparatus, the servo-signal beam is divided into two spots and the servo-control is effected so that when the diameters of the two spots are identical, the beams are focused on the surface of the opto-magnetic disc and thereby the focused state is maintained, in accordance with a detection signal of a light receiving element which receives the two spots of the servo-signal beam. The data signal beam is split into bundles of light having a polarization different from the servo-signal light. The split bundles of data signal light are received by another light receiving element to obtain a data signal (magneto-optic recording signal MO).

In a photomagnetic head apparatus as constructed above, attempts have been made to improve the beam splitters which split the servo-signal light and data signal light. Attempts have also been made to improve an optical arrangement of the light receiving elements, and improve a signal processing circuit for the light receiving elements. However, there is still a need for a simple photomagnetic head apparatus having a simpler optical system and in which the servo-signal and the data signal are independent and do not interfere with each other.

In response to this need, the assignee of the present application has proposed a photomagnetic head apparatus having a uniaxial (single optical axis) signal detection system, namely Japanese patent application No. HEI 7-18109 (U.S. Ser. No. 08/418,575). In the uniaxial signal detection system, the laser beam reflected by the opto-magnetic recording disc is split by a Wollaston prism into three bundles of light (rays) having different polarization directions, so that one of the three beam bundles is used as servo-light. The remaining two beam bundles are used as data signal light. The servo-light is split in a direction perpendicular to the direction of separation of light by the Wollaston prism. Thereafter, when the split beams are transmitted through a hologram plate, a certain amount of defocus in the positive and negative directions, with respect to the optical axis, is caused in the split beams. The split beams of the servo-light emitted from the hologram plate are condensed by a condenser lens toward a pair of servo-signal sensors to obtain a servo-signal light. Each of the two data signal light bundles is split in a direction perpendicular to the split direction of the data light by a hologram plate. The split beams of the data signal light are made incident upon two pairs of data signal sensors located above and below the servo-signal sensors to obtain a data signal.

In the principle of detection of the focus/track error using a spot-size method, it is assumed that the shape or the intensity distributions of the right and left beam spots are identical when an image is focused on the recording disc. Even if the shape or intensity distribution of the right and left beam spots are slightly different in a focused position, the focus/track error control can be precisely carried out under a certain condition. However, when the laser beam spot moves across the concentric recording tracks of the recording disc, a T/F crosstalk (interference with a track cross signal due to an error) due to an asymmetrical shape of the spots of the laser beams reflected from the opto-magnetic recording disc occurs, thus resulting in an adverse influence on the focus servo-control or high-speed seeking operation.

As mentioned above, in the photomagnetic head apparatus proposed by the assignee of the present application, the servo-signal light emitted from the hologram plate is condensed by the condenser lens and is thereafter received by a pair of servo-signal sensors to obtain a servo-signal. In general, a spherically polished combination glass lens or the like exhibits a good aberration property, in which various aberrations are effectively corrected not only for the axial rays, but also for the off-axis rays. Hence, if the condenser lens is made of a combination glass lens, the beam spots converged onto the light receiving elements of the compound sensors are less influenced by the lens aberration. Consequently, the shapes and intensity distribution of the beam spots formed by the on-axis rays (axial rays) and the off-axis rays are substantially identical, thus resulting in little or no possibility of the occurrence of the T/F crosstalk.

However, since the spherical combination glass lens is expensive and large, the condenser lens is generally made of a single, small and inexpensive lens. If such a lens is used, particularly the off-axis rays are considerably influenced by aberrations. Accordingly, there is a need to realize a photomagnetic head apparatus in which the signal lights are little influenced by aberrations caused by the single lens.

SUMMARY OF THE INVENTION

It is an object of the present invention to provide a photomagnetic head apparatus having a uniaxial signal detection system, in which, if a single small lens is employed as a condenser lens of an optical signal detection system, an aberration caused by the lens is restricted to reduce a T/F crosstalk to thereby have little or no adverse influence on the focus servo-control or high-speed seeking.

To achieve the object mentioned above, according to an aspect of the present invention, there is provided a photomagnetic head apparatus having a beam splitter which splits a laser beam, reflected by concentric recording tracks of a rotating photomagnetic recording disc, into three bundles of rays. The three bundles of rays have different polarization directions in a plane which lies in a radial direction of the recording tracks. One of the three bundles of rays is used as a servo-signal light, and the remaining two bundles of rays are used as data signal lights. A defocusing diffraction element splits at least the servo-signal light into at least two bundles of rays in a direction corresponding to the tangential direction of the recording tracks, substantially perpendicular to the split direction of the beam splitter and which provides at least two split lights with a predetermined amount of positive or negative defocus in an optical axis direction. A pair of servo-signal light receiving elements receive the split beams of the servo-signal light produced by the defocusing diffraction element. A data light receiving element receives the data signal lights. The defocusing diffraction element is made of a non-circular element whose numerical aperture in the tangential direction of the recording tracks is smaller than the numerical aperture in the radial direction.

Preferably, the defocusing diffraction element has a width in the tangential direction of the recording tracks smaller than a width in the radial direction of the recording tracks.

Preferably, data light receiving elements are provided to receive the data signal lights. The defocusing diffraction element defines a substantially circular shape together with a linear diffraction element, so that light transmitted through the linear diffraction element can be received by the data light receiving element without being made incident upon the servo-signal light receiving elements.

It is preferred that there are two linear diffraction elements located on opposite sides of the defocusing diffraction element and connected to the defocusing diffraction element at straight separation lines which extend in the radial direction of the recording tracks. Alternatively, the two linear diffraction elements can be connected to the defocusing diffraction element at V-shaped separation lines which are symmetrical with respect to the tangential direction of the recording tracks.

Preferably, the beam splitting assembly is a birefringent polarization element.

Preferably, the defocusing diffraction element is a non-polarization phase hologram element, or can equally be a phase type hologram element having no polarization property.

Preferably, the beam splitting assembly is a Wollaston prism.

According to another aspect of the present invention, a photomagnetic head apparatus is provided, having a beam splitting assembly which splits a laser beam reflected by concentric recording tracks of a photomagnetic recording disc which is rotated, into three bundles of rays. The three bundles of rays have different polarization directions in a plane which lies in a radial direction of the recording tracks. One of the three bundles of rays is for a servo-signal light and the remaining two bundles of rays are for data signal lights. A non-circular defocusing diffraction element splits the servo-signal light into at least two bundles of rays in a direction corresponding to a tangential direction of the recording tracks, substantially perpendicular to a split direction of the beam splitting assembly and which provides at least two split lights with a predetermined amount of positive or negative defocus in an optical axis direction. The defocusing diffraction element defines a substantially circular shape together with a linear diffraction element. A pair of servo-signal light receiving elements receive the split beams of the servo-signal light produced by the defocusing diffraction element. Data signal light receiving elements receive the data signal lights. A condenser lens gathers the servo-signal light and the data signal light onto the servo-signal elements and the data signal elements. The servo-signal light receiving elements and the data signal light receiving elements are arranged such that light transmitted through and split by the linear diffraction element is received by the data light receiving elements without being made incident upon the servo-signal light receiving elements.

Preferably, the shape of the data signal light receiving elements is elongated in a direction corresponding to the radial direction of the recording tracks compared with the servo-signal light receiving elements.

Preferably, all data signal light split by the beam splitting assembly, the defocusing diffraction element and the linear diffraction element is made incident upon the data signal light receiving elements. The servo-signal light split by the beam splitting assembly and the defocusing diffraction element is made incident upon the servo-signal light receiving elements. The servo-signal light split by the beam splitting assembly and the linear diffraction element is not made incident upon the servo-signal light receiving elements.

Preferably, the beam splitting assembly is a Wollaston prism.

The defocusing diffraction element is preferably a phase type hologram element having no polarization property.

The present disclosure relates to subject matter contained in Japanese Patent Application No. HEI 7-199923 (filed on Aug. 4, 1995) which is expressly incorporated herein by reference in its entirety.

BRIEF DESCRIPTION OF THE DRAWINGS

The present invention will be described below in detail with reference to the accompanying drawings, in which like elements are indicated by like reference numerals, and wherein:

FIG. 5 is a side view of the signal detection system shown in FIG. 2;

DESCRIPTION OF THE PREFERRED EMBODIMENTS

Figure 1:
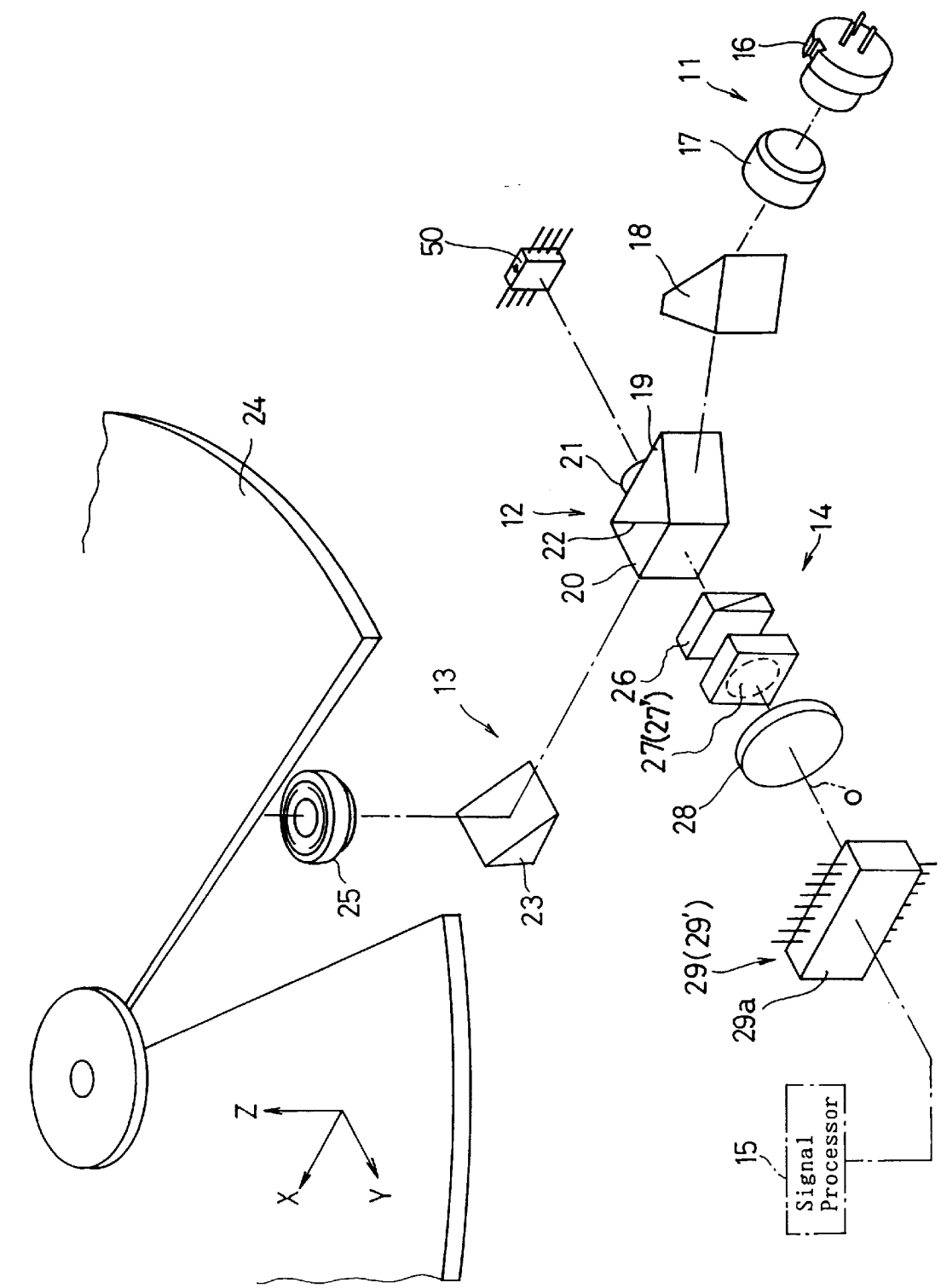
FIG. 1 is a perspective view of a signal detection system in a photomagnetic head apparatus according to the present invention.

FIG. 1 shows a perspective view of a signal detection system in a photomagnetic head apparatus according to an embodiment of the present invention.

A uniaxial signal detection system, i.e., a single optical axis type, consists of a light source assembly 11, a prism assembly 12, an objective optical system 13, a signal detecting portion 14, and a signal processor 15.

The light source assembly 11 is provided with a semiconductor laser 16, a collimating lens 17 and an anamorphic prism 18. The semiconductor laser 16 emits divergent light which is collimated by the collimating lens 17, and shaped by the anamorphic prism 18.

The prism assembly 12 consists of an anamorphic prism 19, a condenser lens 21 and a right-angle prism 20. The anamorphic prism 19 shapes the bundle of rays emitted from the anamorphic prism 18 into a circular shape (i.e., having a circular cross section). The condenser lens 21 is adhered to the anamorphic prism 18 and the right-angle prism 20 is adhered to the anamorphic prism 18. The connection (adhered) surface between the anamorphic prism 19 and the right-angle prism 20 defines a half-mirror surface 22.

Part of the light (laser beam) emitted from the light source 11 is reflected by the half-mirror surface 22 and is converged onto a light receiving element 50 by the condenser lens 21. The remaining part of the light emitted from the light source 11 is transmitted through the half-mirror surface 22 and is reflected upwardly by a mirror prism 23. The mirror prism 23 is provided in the objective lens system 13. The light receiving element 50 converts the light incident thereupon into an electrical signal for automatically controlling the output of the semiconductor laser 16.

The objective lens system 13 consists of the mirror prism 23 and an objective lens 25. The mirror prism 23 reflects the light transmitted through the anamorphic prism 19 and the half mirror surface 22 in the upward direction. The objective lens 25 converges the light reflected by the mirror prism 23 onto a photomagnetic recording disc 24.

The photomagnetic disc (magneto optic disc) 24 is rotatably held by a support (not shown) and is provided on a rear surface thereof, as viewed in FIG. 1, with concentric recording tracks.

The objective lens 25 and the mirror prism 23 are provided in a head (not shown) which is driven to move in a radial direction X of the recording disc 24. The objective lens 25 is moved in the radial direction X, as viewed in FIG. 1, of the recording disc 24 by the movement of the head. The objective lens 25 is moved in the direction Z, i.e., the vertical direction as viewed in FIG. 1, by an actuator (not shown) to coincide a focused point of the laser beam with the recording surface of the recording disc 24.

The light reflected by the photomagnetic recording disc 24 is transmitted through the objective lens 25. The light is subsequently reflected substantially by 90° by the mirror prism 23 toward the prism assembly 12. Then, the laser beam is reflected by the half-mirror surface 22 by 90° toward the signal detecting portion 14. The signal detecting portion 14 consists of a Wollaston prism 26, a hologram plate 27, a condenser lens 28, and a compound sensor 29.

Figure 2:
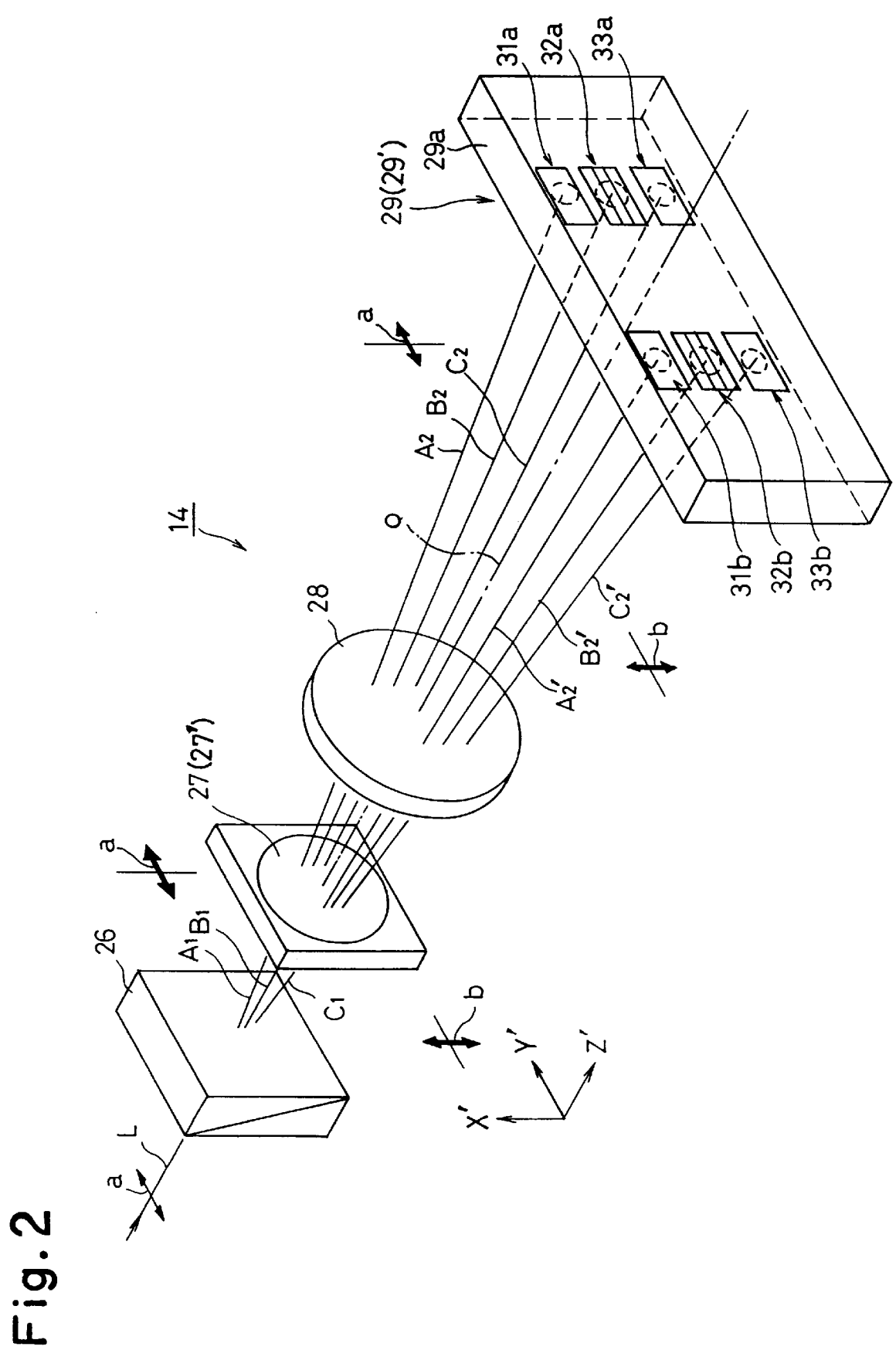
FIG. 2 is a perspective view of a main part of the signal detection system shown in FIG. 1.

The Wollaston prism 26 is a crystal birefringent polarizing optical element. The Wollaston prism 26 splits the laser beam L reflected by the recording disc 24, i.e., the linearly polarized light having a polarization direction "a", into three bundles of light $A_1$, $B_1$ and $C_1$, as can be seen in FIG. 2. The three bundles of light $A_1$, $B_1$ and $C_1$ each have different polarization directions in a specific plane.

The Wollaston prism 26 consists of a first crystal member whose crystal axis is rotated about the optical axis "0" by −45° or +45° with respect to the Y' axis as viewed from the light incident side, and a second crystal member whose crystal axis is rotated about the optical axis "0" by +71.5° or −71.5° with respect to the axis Y' as viewed from the incident side of the light, to obtain a predetermined distribution ratio (split ratio) of the quantity of light. Note that the combination of the crystal axis directions of the crystal members of the Wollaston prism 26 is not limited to a combination of −45° or +45° and +71.5° or −71.5° mentioned above to obtain a predetermined distribution ratio of the quantity of light.

The bundle of light $A_1$ has a single polarization component whose polarization direction is substantially parallel with the polarization direction "a" of the bundle of light L. The bundle of light $C_1$ has a single polarization component whose polarization direction "b" is substantially perpendicular to the polarization direction "a" of the bundle of light L. The bundle of light $B_1$, positioned between the light Al and the light $C_1$, has a polarization component having the polarization directions "a" and "b". It should be understood that the polarization direction of the light L is not limited to the direction "a" (parallel with the axis Y') and can be a direction perpendicular to the axis Y'.

The polarization direction of the light $A_1$ transmitted through the Wollaston prism 26 is not limited to the direction "a". Namely, the polarization direction of the light $A_1$ can be a direction other than the direction "a" depending on the distribution ratio (split ratio) of the quantity of light to be split by the Wollaston prism 26. Similarly, the polarization direction of the light $C_1$ transmitted through the Wollaston prism 26 is not limited to the direction "b" (parallel with the axis X'). Namely, the polarization direction of the light $C_1$ can be a direction other than the direction "b" depending on the distribution ratio (split ratio) of the quantity of light to be split by the Wollaston prism 26.

Figure 11:
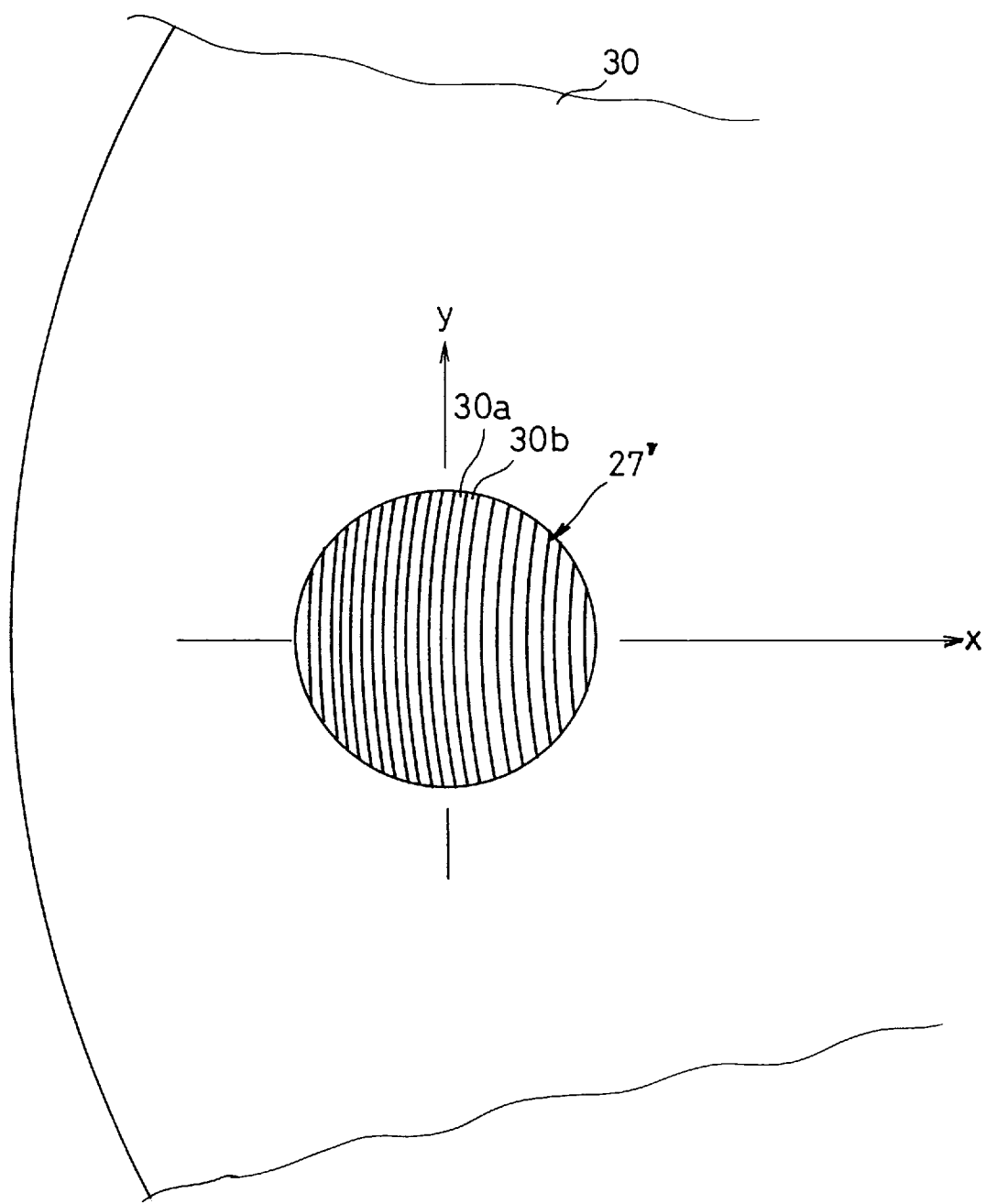
FIG. 11 is a schematic view of optical characteristics of a reference hologram plate, based upon which the present invention has been made.

Prior to an explanation of the hologram plate 27 which is employed in the signal detecting portion 14, a hologram plate 27' upon which the hologram plate 27 is based, will be discussed below with reference to FIGS. 11 and 12.

The hologram plate 27' is made of a phase type hologram element having no polarization property, which can be formed by a conventional patterning process. A hologram is formed by recording (an intensity of) interference fringes which are in turn produced by an interference of a wavefront reflected by or transmitted through an object and a reference wavefront. Namely, the hologram is a recorded interference pattern of a defocus wavefront (spherical wave) and/or a tilt wavefront (inclined plane wave).

The hologram plate 27' is obtained by cutting a part of a transparent substrate 30. The transparent substrate 30 is provided with a number of arched recesses and projections 30a and 30b (FIG. 12) which are in the form of a part of concentrical annular recesses and projections. The recesses and projections 30a and 30b are rectangular in cross section. In FIG. 11, the center of curvature of each arched recess and projection 30a and 30b is located on the axis X. Namely, the center of the circular hologram plate 27', having an arched pattern of recesses and projections 30a and 30b , is not identical to the center of the circular transparent substrate 30. Note that the duty ratio of any adjacent recess and projection 30a and 30b is approximately 1:1.

The recesses and projections 30a and 30b have a concentrical pattern (function as a defocus wavefront) in which the pitch p (FIG. 12) of the recesses and projections 30a and 30b increases (becomes dense) as represented by a quadric function toward the periphery of the substrate and a linear pattern (function as a tilt wavefront) in which the pitch p of the recesses and projections 30a and 30b is uniformly constant in the Y'-axis direction. Thus, light incident upon the hologram plate 27' is given, by the hologram plate 27', a positive or negative tilt component (wavefront) to incline the optical axis of the incident light, and a positive or negative defocus component (wavefront) in the axial direction. Consequently, a desired optical property of the optical disc head can be obtained by properly setting the two patterns.

Figure 12:
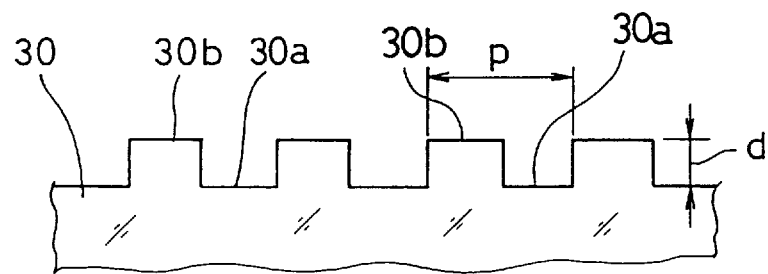
FIG. 12 is an enlarged sectional view of the hologram plate shown in FIG. 11.

Although the sectional shape of the projections and recesses of the hologram plate 27' is rectangular in the illustrated embodiment as shown in FIG. 12, the projections and recesses are not limited thereto, and can be, for example, a sine-wave shape, stepped shape or serrated shape, etc. Also, it is possible to obtain a desired distribution ratio of the quantity of light by varying the depth "d" of the recesses 30a or the height of the projections 30b. The recesses and projections 30a and 30b of the hologram disc 27 can be formed by etching or a vapor deposition of appropriate material, etc.

The signal detection system using the hologram plate (reference hologram disc) 27' will now be discussed below.

The hologram plate 27' splits the three bundles of light $A_1$, $B_1$ and $C_1$, split in the direction X' (FIG. 2) corresponding to the radial direction X of the recording disc 24 by the Wollaston prism 26, into two bundles of light $A_2$, $B_2$, $C_2$, and $A_2'$, $B_2'$, $C_2'$ in the direction Y' corresponding to the tangential direction Y of the recording disc 24, perpendicular to the direction X'. A predetermined amount of positive or negative defocus in the direction of the optical axis 0 of the signal detection system is caused between the split beams $A_2$, $B_2$ and $C_2$, and $A_2'$, $B_2'$ and $C_2'$. Consequently, the light L reflected by the recording disc 24 is split into six bundles of light consisting of three pairs of light $A_2$, $A_2'$ and $B_2$, $B_2'$ and $C_2$, $C_2'$. The bundles of light $A_2, A_2'$ and $C_2, C_2'$ are used as magneto-optic signals (data signals) MO and pre-format signals (data signals) P0, respectively. The bundles of light $B_2$, $B_2'$ are used as servo-signals, i.e., focus error signals FE and tracking errors TE. The beam spots of the three pairs of bundles of signal lights $A_2$, $A_2'$ and $B_2$, $B_2'$ and $C_2$, $C_2'$ have different diameters in the lateral direction (horizontal direction) in FIG. 2 due to a predetermined amount of defocus provided thereto, but have a substantially identical diameter in the vertical direction in FIG. 2. Namely, the diameters of the beam spots formed by the bundles of light $A_2$, $B_2$ and $C_2$ are substantially identical to each other, and the diameters of the beam spots formed by the bundles of light $A_2'$, $B_2'$ and $C_2'$ are substantially identical to each other, but the diameters of the beam spots formed by the bundles of light $A_2$, $B_2$ and $C_2$ are different from the diameters of the beam spots formed by the bundles of light $A_2'$, $B_2'$ and $C_2'$ (see FIGS. 3 and 5).

The compound sensor 29 includes data signal light receiving elements 31a, 31b, 33a, 33b and servo-signal light receiving elements 32a, 32b, that convert the six bundles of light emitted from the hologram plate 27' and transmitted through the condenser lens 28 into electric signals. The light receiving elements 31a, 31b, 32a, 32b, 33a and 33b are housed in a same package (unit) 29a and lie in a plane perpendicular to the optical axis 0 (light L). The light receiving elements 31a, 31b, 32a, 32b, 33a and 33b of the compound sensor 29 are arranged as shown in FIG. 2 so as to receive the split bundles of light $A_2, A_2', B_2, B_2', C_2, C_2'$, respectively. Namely, there are three pairs of light receiving elements, i.e., a first pair of light receiving elements 31a and 31b (upper light receiving elements), a second pair of light receiving elements 32a and 32b (intermediate light receiving elements), and a third pair of light receiving elements 33a and 33b (lower light receiving elements), as viewed in the vertical direction X' in FIG. 2. The three pairs of light receiving elements 31a, 31b, 32a, 32b, 33a and 33b of the compound sensor 29 are also grouped in the horizontal direction Y' into two (right and left) groups, each consisting of three light receiving elements 31a, 32a, 33a and 31b, 32b, 33b.

Figure 7:
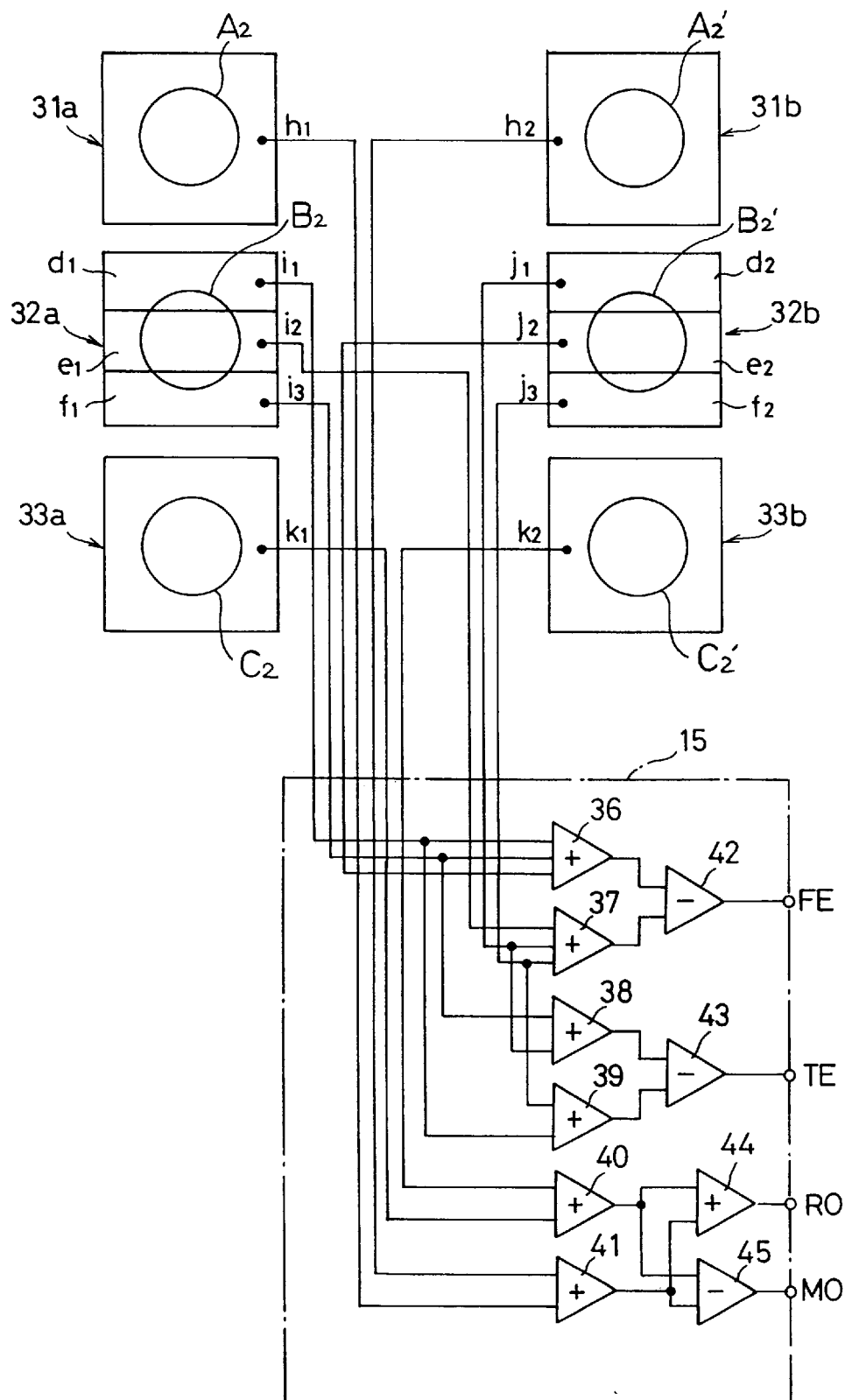
FIG. 7 is a schematic circuit diagram of light receiving elements and a signal processor.

The first pair of light receiving elements 31a and 31b (upper light receiving elements) are adapted to detect the magneto-optic recording signal MO and the pre-format signal RO. As can be seen in FIG. 7, the data signal light receiving element 31a issues an output signal h1 when it receives the bundle of light whose polarization direction is "a", transmitted through the hologram plate 27'. The data signal light receiving element 31b issues an output signal h2 when it receives the bundle of light whose polarization direction is "b", transmitted through the hologram plate 27'.

The second pair of light receiving elements 32a and 32b (intermediate light receiving elements) are adapted to detect the focus error signal FE and the tracking error signal TE. The light receiving surface of each of the servo-signal light receiving elements 32a and 32b is split into three detecting sections (areas) d1, e1, f1, and d2, e2, f2 in the radial direction parallel with the direction X' in FIG. 2. The servo-signal light receiving element 32a issues output signals i1, i2 and i3 corresponding to the detection areas d1, e1 and f1 when the latter receive the bundle of light transmitted through the hologram plate 27', respectively. The servo-signal light receiving element 32b issues output signals j1, j2 and J3 corresponding to the detection areas d2, e2 and f2 when the latter receive the bundle of light transmitted through the hologram plate 27', respectively.

Note that the number of divided detection areas of the light receiving surface of each of the light receiving elements 32a and 32b is not limited to three.

Figure 8:
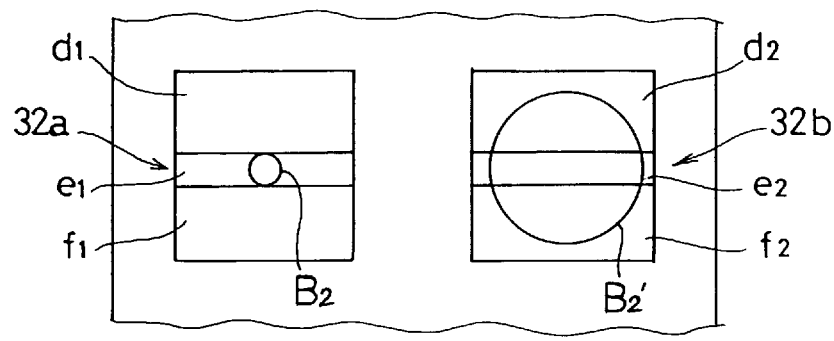
FIGS. 8, 9 and 10 are schematic views of beam spots formed on a light receiving element of a compound sensor for a servo-signal.
Figure 9:
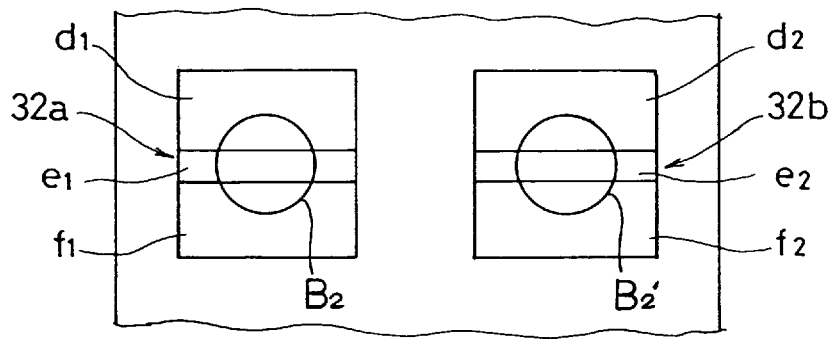
Figure 10:
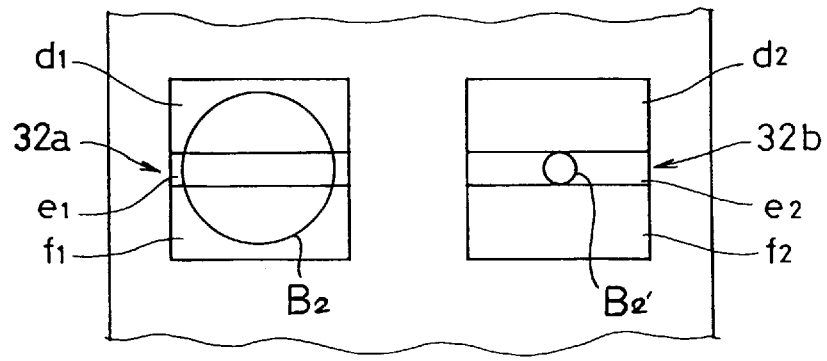

The position and diameter of the beam spots incident upon the servo-signal light receiving elements 32a and 32b are as shown in FIGS. 8, 9 and 10. When the objective lens 25 is located close to the magneto-optic recording disc 24, the focused state is established. When the image is focused, the position and diameter of the beam spots incident upon the servo-signal light receiving elements 32a and 32b are identical, as shown in FIG. 9.

The third pair of light receiving elements 33a and 33b (lower light receiving elements) are adapted to detect the magneto-optic recording signal MO and the pre-format signal RO. The data signal light receiving element 33a issues output signal k1 when it receives the bundle of light whose polarization direction is "a", transmitted through the hologram plate 27'. The data signal light receiving element 33b issues an output signal k2 when it receives the bundle of light whose polarization direction is "b", transmitted through the hologram plate 27'.

The signal processor 15 consists of adding circuits (adders) 36 through 41 and 44, and subtracting circuits (subtracters) 42, 43 and 45. The adder 36 adds the outputs i1, i3, and j2 corresponding to the split detection areas d1 and f1 of the servo-signal light receiving element 32a and the split detection area e2 of the servo-signal light receiving element 32b. The calculation result of the adder 36 is supplied to the subtracter 42. The adder 37 adds the outputs i2, j1, and j3 corresponding to the split detection area e1 of the servo-signal light receiving element 32a and the split detection areas d2 and f2 of the servo-signal light receiving element 32a. The calculation result of the adder 37 is supplied to the subtracter 42. The subtracter 42 calculates a difference between the outputs of the adders 36 and 37 in accordance with the following equation, to obtain the focus error signal FE:

$$FE=(i1+i3+j2)-(i2+j1+j3)$$

The adder 38 adds the outputs i3 and j1 output from the split detection area f1 and the split detection area d2 of the servo-signal light receiving elements 32a and 32b. The calculation result of the adder 38 is supplied to the subtracter 43. The adder 39 adds the outputs i1 and j3 output from the split detection area d1 and the split detection area f2 of the servo-signal light receiving elements 32a and 32b. The calculation result of the adder 39 is supplied to the subtracter 43. The subtracter 43 calculates a difference between the outputs of the adders 38 and 39 in accordance with the following equation, to obtain the tracking error signal TE:

$$TE=(i3+j1)-(i1+j3)$$

The adder 40 adds the outputs k1 and k2 output from the data light receiving element 33a and the data light receiving element 33b. The calculation result of the adder 40 is supplied to the adder 44 and the subtracter 45. The adder 41 adds the outputs h1 and h2 output from the data light receiving element 31b and the data light receiving element 31b. The calculation result of the adder 41 is supplied to the adder 44 and the subtracter 45. The adder 44 calculates the sum of the outputs of the adders 40 and 41 in accordance with the following equation, to obtain the pre-format signal RO:

$$RO=(k1+k2)+(h1+h2)$$

The subtracter 45 calculates a difference between the outputs of the adders 40 and 41 in accordance with the following equation, to obtain the magneto-optic recording signal MO:

$$MO=(k1+k2)-(h1+h2)$$

The focus error signal FE, the tracking error signal TE, the pre-format signal RO, and the magneto-optic recording signal MO thus obtained, are supplied to a reproduction circuit (not shown) and a servo-circuit (not shown) to carry out predetermined control operations.

As can be understood from the foregoing, in the photomagnetic head apparatus, the light L reflected by the photomagnetic recording disc 24 is split into three bundles of light $A_1$, $B_1$ and $C_1$ in the direction X' (FIG. 2) corresponding to the radial direction X of the recording disc 24 by the Wollaston prism 26. One of the three bundles of light, i.e., the bundle of light $B_1$, is used as a servo-signal and the other two bundles of light $A_1$ and $C_1$ are used as data signals. Each of the bundles of light $A_1$, $B_1$, $C_1$ is split into two bundles of light in the direction Y' corresponding to the tangential direction Y to the recording disc 24. The servo-signal light receiving elements 32a and 32b, which receive the split servo-signal bundles of light $B_2$ and $B_2'$, and the data light receiving elements 31a, 31b and 33a, 33b, which receive the split data signal bundles of light $A_2$, $A_2'$ and $C_2$ $C_2'$, are arranged at appropriate positions. Consequently, data recorded on the recording medium 24 can be correctly read by appropriately converging (or focusing) the laser beam onto the recording surface of the recording medium 24 based on control data produced in accordance with a change in the shape of the beam spots due to the movement of the recording disc 24 away from or close to the head.

Figure 3:
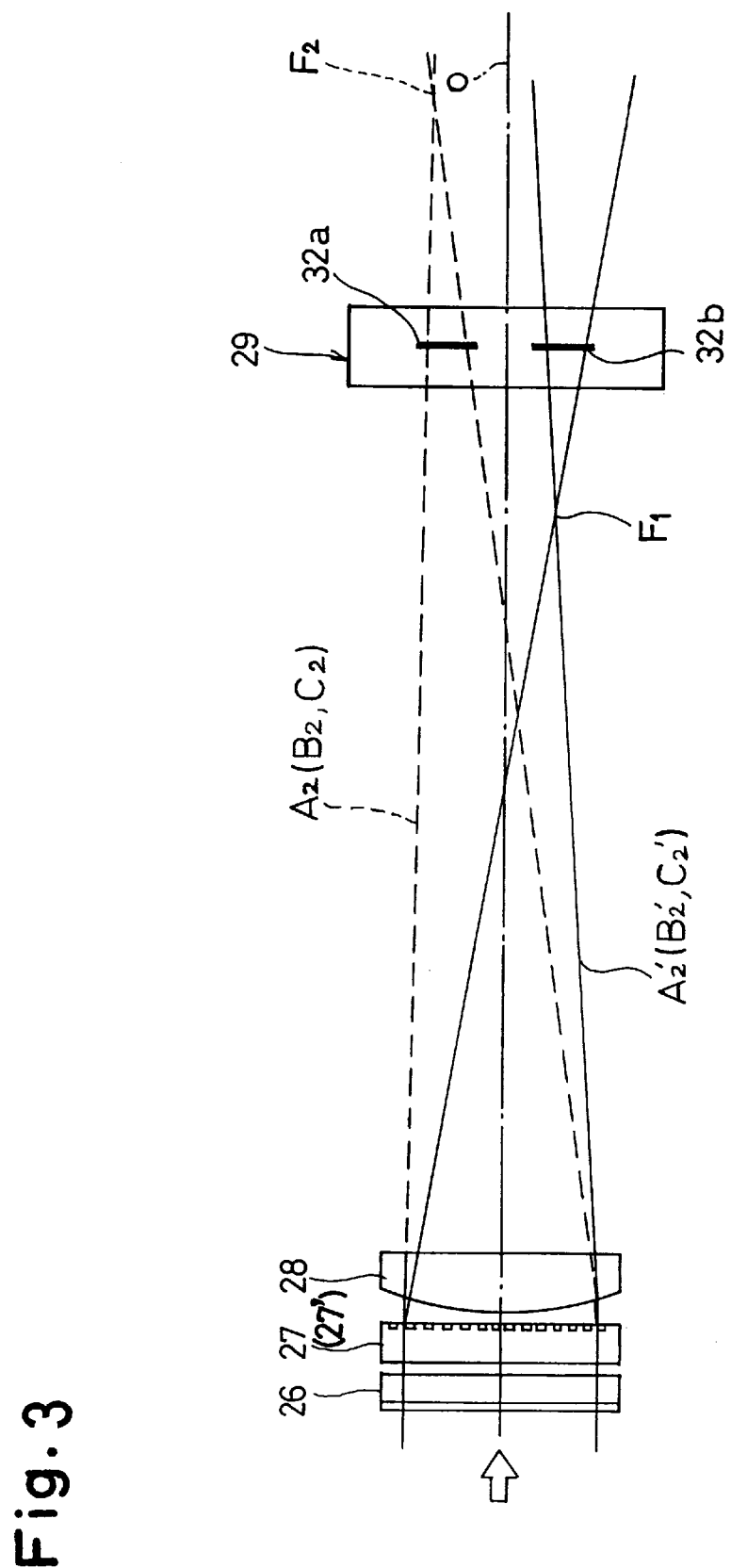
FIG. 3 is a plan view of the signal detection system shown in FIG. 2, having a removed light receiving element.
Figure 4:
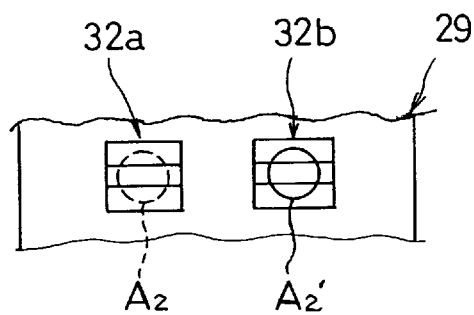
FIG. 4 is a schematic view of beam spots formed on a light receiving element for a servo-signal in a state shown in FIG. 3.
Figure 6:
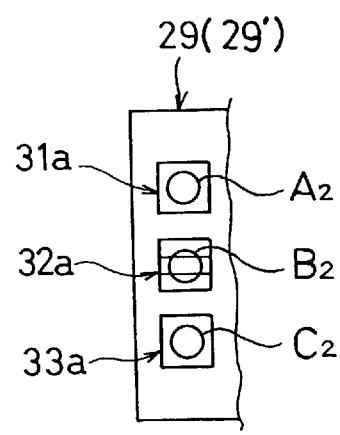
FIG. 6 is a schematic view of beam spots formed on a light receiving element in a state shown in FIG. 5.

The three pairs of bundles of light $A_2$, $B_2$, $C_2$ and $A_2'$, $B_2'$, $C_2'$ correspond to first-order diffraction light produced by the hologram plate 27' and the focal positions F1 and F2 thereof are shifted on the optical axis 0 due to the amount of defocus, as shown in FIG. 3. However, since the entirety of the compound sensor 29 including the servo-signal light receiving elements 32a, 32b and the data signal light receiving elements 31a, 31b and 33a, 33b is located substantially at an intermediate position between the front and rear focal points F1 and F2 in the optical axis direction 0, the diameters of the beam spots of the bundles of light $B_2$, $B_2'$ and $A_2$ $C_2$, $A_2'$, $C_2'$ incident upon the compound sensor 29 are substantially identical in the vertical and horizontal directions when the objective lens 25 is in a focused state. Thus, the focus error or the tracking error and the position of the sensors which supply the magneto-optic recording signal and pre-format signal can be corrected or adjusted only by the adjustment of the output state of the servo-signals from the right and left servo-signal light receiving elements 32a and 32b.

The above discussion has been directed to the control operation using the hologram plate 27'. In the principle of the detection of the focus/track error using the spot-size method as discussed above, the shape and intensity distribution of the right and left beam spots must be identical in a focused state. If the shape or intensity distribution of the right and left beam spots are slightly different in a focused position, the focus/track error control can be precisely carried out under a certain condition. However, when the laser beam spot moves across the concentric recording tracks of the recording disc, a T/F crosstalk (interference with a track cross signal due to an error) due to an asymmetrical shape of the spots of the laser beams reflected from the opto-magnetic recording disc occurs, thus resulting in an adverse influence on the focus servo-control or high-speed seeking operation.

In the photomagnetic head apparatus as constructed above, the servo-signal lights $B_2$ and $B_2'$ emitted from the hologram plates 27' are condensed by the condenser lens 28 and are thereafter made incident upon the servo-signal light receiving elements 32a and 32b to obtain a servo-signal. If the condenser lens 28 is made of a spherically polished combination glass lens, the following advantages can be obtained. Namely, since the spherically polished combination glass lens exhibits good aberration characteristics, i.e, since the spherical aberration, comatic aberration and astigmatism are corrected for not only the on-axis rays but also the off-axis rays (light obliquely incident upon the combination glass lens), the beam spots formed on the respective light receiving elements are free from or little influenced by the aberrations of the lens. Consequently, the on-axis rays and the off-axis rays have substantially identical beam spot shapes and intensity distributions, and hence little or no T/F crosstalk occurs.

However, since combination glass lenses are large and expensive, the condenser lens is generally made of a single, small and inexpensive lens. If such a single lens is used, particularly the off-axis rays are considerably influenced by aberrations. Accordingly, it is necessary to eliminate or reduce an adverse influence by the aberrations caused by the single lens if the combination glass lens is used in the signal detection system.

Figure 13:
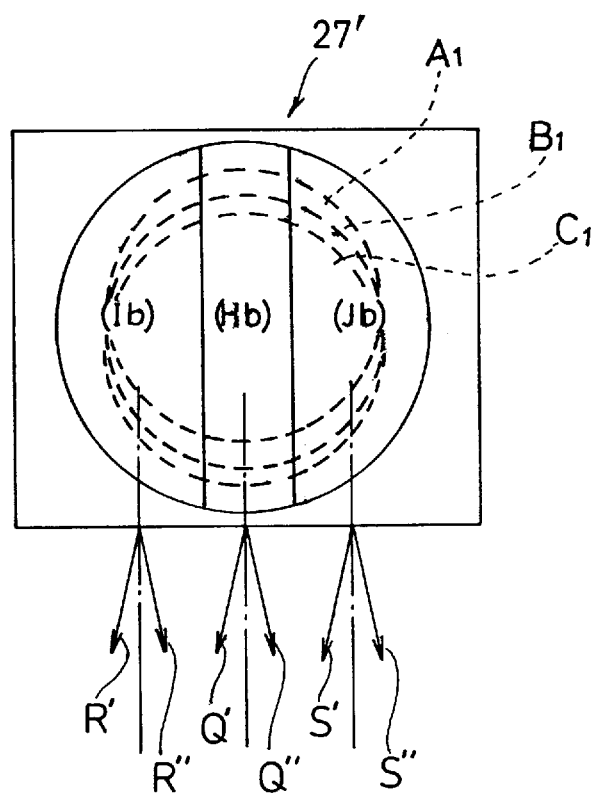
FIG. 13 is a front elevational view of the hologram plate shown in FIG. 11, for the purpose of explaining its drawbacks.

To solve this problem, the inventors of the present invention have focused attention on the hologram plate 27' which splits each of the three bundles of light $A_1$, $B_1$ and $C_1$ into two bundles of light. In FIG. 13, assuming that the hologram plate 27' is provided with a longitudinal central portion (first area) Hb and left and right portions (second areas) Ib, Jb located on opposite sides of the first area Hb, the diffraction angle at the first area Hb is different from that at the second areas Ib and Jb. Consequently, when the three bundles of light $A_1$, $B_1$ and $C_1$ (overlapping each other at a large part thereof, as shown in FIG. 13), split by the Wollaston prism 26, are transmitted through the hologram plate 27', ±1st-order diffraction lights Q' and Q" are produced in a direction corresponding to the tangential direction (lateral direction in FIG. 13) to the recording disc 24 in the first area Hb of the hologram plate 27'. Also, ±1st-order diffraction lights R', R" and S' and S" are produced in the second areas Ib and Jb of the hologram plate 27', respectively. Namely, the incident bundles of light $A_1$, $B_1$ and $C_1$ become 18 {=($A_1$, $B_1$, $C_1$)×((Hb, Ib, Jb)×(±diffraction)} positive and negative diffraction lights in total when passing through the first and second areas Hb, Ib and Jb of the hologram plate 27'. Note that the diffracted bundles of light Q', Q", R', R", S', S" produced upon passing through the first and second areas Hb, Ib and Jb of the hologram plate 27' contain the same amount of defocus Δ S for each pair of diffracted bundles of light Q' and Q", R' and R" and S' and S".

Among the bundles of light $A_1$, $B_1$ and $C_1$, only the ±1st-order diffraction lights of the center light $B_1$ are used as the servo-signal light, and the other bundles of light $A_1$ and $C_1$ are used as data signal lights. Accordingly, so long as the bundles of light $A_1$ and $C_1$ are received by the detection areas of the data light receiving elements 31a, 31b and 33a, 33b, the aberrations caused by the condenser lens 28 do not cause adverse influence to the signal processing. For the same reason, so long as a change in the amount of the magneto-optic signal light can be detected, the beam spot shapes of the lights $A_1$ and $C_1$ do not cause adverse influence to the signal processing. From the foregoing, it can be understood that the most significant light is the servo-signal light $B_1$ Since the light $B_1$ is diffracted by the hologram plate 27' and made obliquely incident upon the condenser lens 28 as off-axis rays, there is an extremely high probability that a T/F crosstalk occurs due to an asymmetrical beam spot shape and a difference in the intensity distribution between the right and left beam spots.

To solve this, the diffraction direction of the hologram plate 27' (corresponding to the direction Y' in FIG. 2) is restricted (i.e., the surface area of the hologram pattern is reduced) to reduce the effective numerical aperture (NA) to thereby apparently reduce the amount of aberrations, such as astigmatism, caused by the condenser lens 28, whereby the shapes and intensity distributions of the right and left beam spots are identical. Namely, the hologram plate 27' is replaced with a hologram plate 27 (see FIG. 14). To restrict the diffraction direction, the hologram plate 27 is split into three sections (areas) including a first longitudinal area H. Since the ±1st-order diffraction lights R', R" and S', S" of the split light $B_1$ produced by the second areas Ib and Jb of the hologram plate 27' are unnecessary as a servo-signal light and have an adverse influence on the servo-signal light, the servo-signal light receiving elements 32a and 32b are square as shown in FIG. 7 so as not to detect the ±1st-order diffraction lights R', R" and S', S" of the split light $B_1$, unlike the rectangular data light receiving elements 31a, 31b, 33a, 33b (FIG. 15).

The following discussion will be addressed to an embodiment of the present invention.

Figure 15:
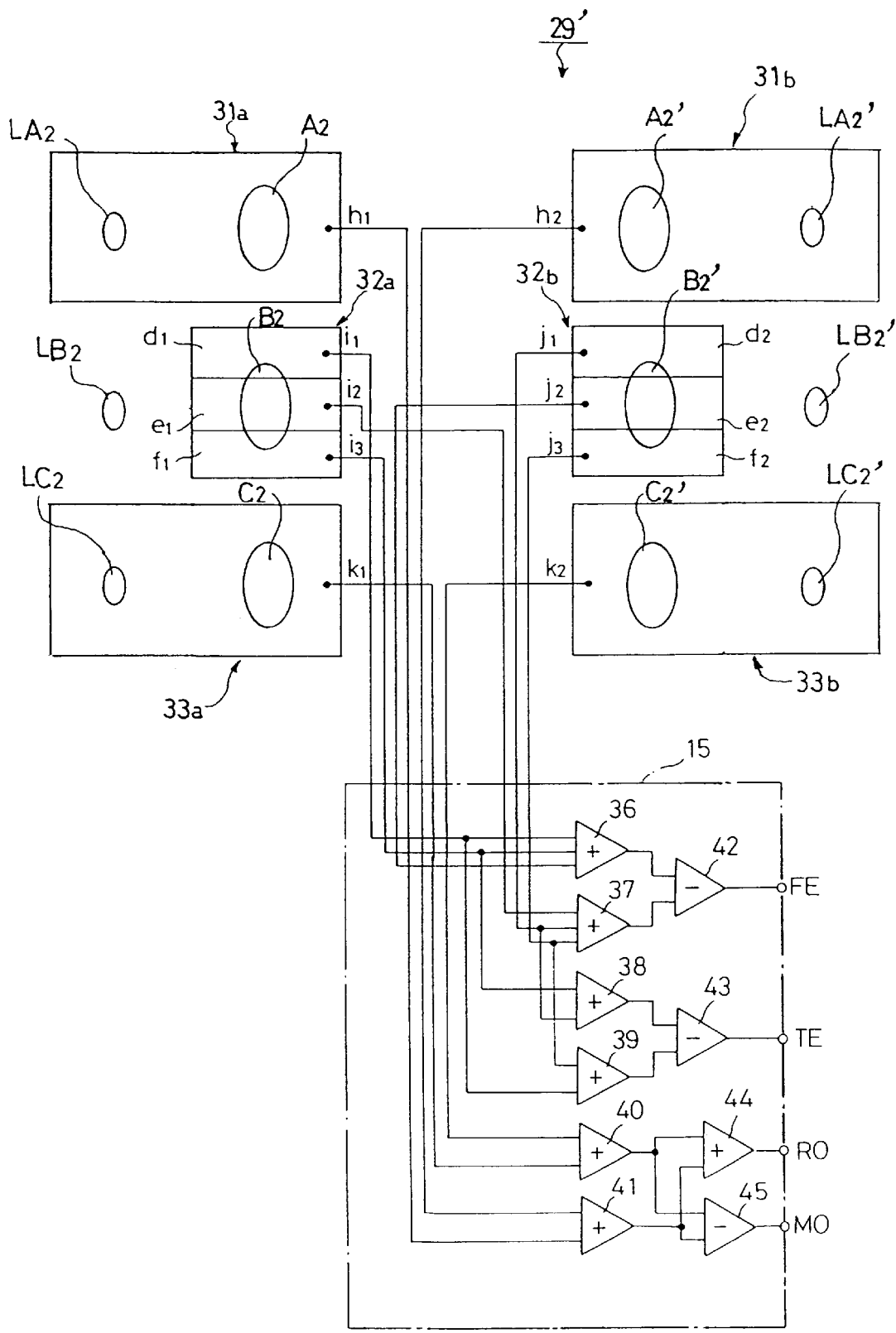
FIG. 15 is a schematic circuit diagram of light receiving elements and a signal processor according to the present invention.
Figure 16:
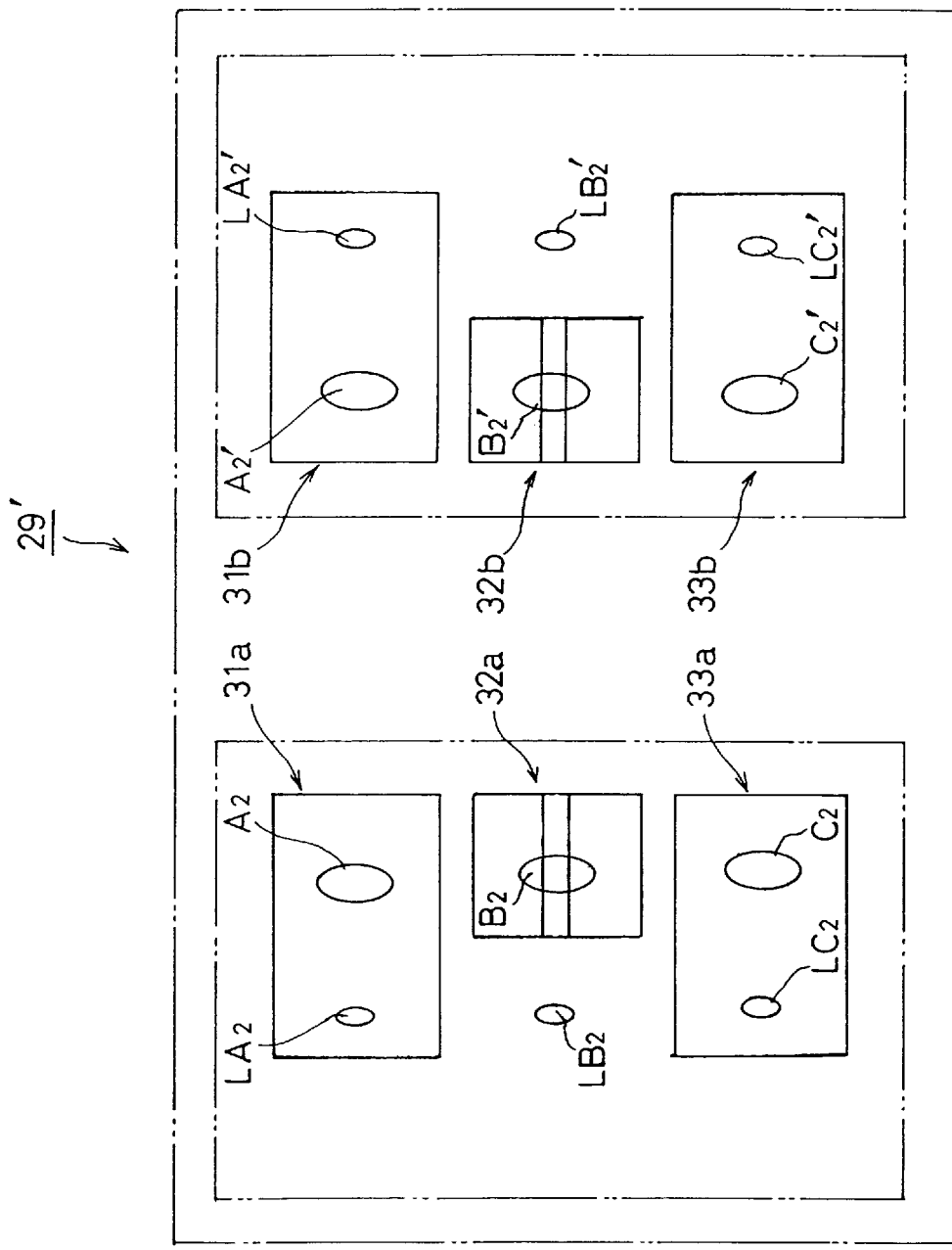
FIG. 16 is a front elevational view of light receiving elements shown in FIG. 14.
Figure 17:
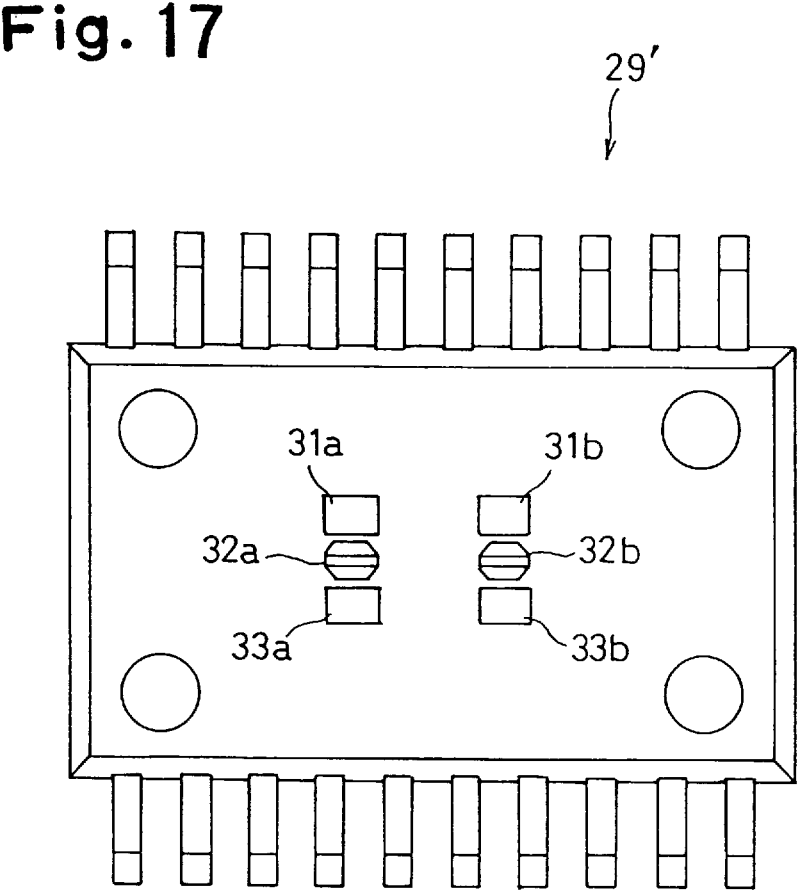
FIG. 17 is a front elevational view of a compound sensor having a package of light receiving elements.

In the present invention, as shown in FIGS. 15 and 16, a compound sensor 29' having data signal light receiving elements and servo-signal light receiving elements is substantially the same as the compound sensor 29 (FIG. 7), except for the rectangular (or elongated) shape of the data signal light receiving elements 31a, 31b, 33a and 33b. An outer appearance of the compound sensor 29' having a package of the light receiving elements 31a, 31b, 32a, 32b, 33a and 33b is shown in FIG. 17, by way of example.

The hologram plate 27 according to the present invention has a reduced hologram pattern area to reduce the effective numerical aperture, and hence, if a single small lens is used as the condenser lens 28 of the signal detection system, the influence of aberrations is restricted, thus resulting in little or no T/F crosstalk. Thus, an adverse influence on the focus servo-control or high-speed seeking operation can be eliminated or reduced.

Figure 14:
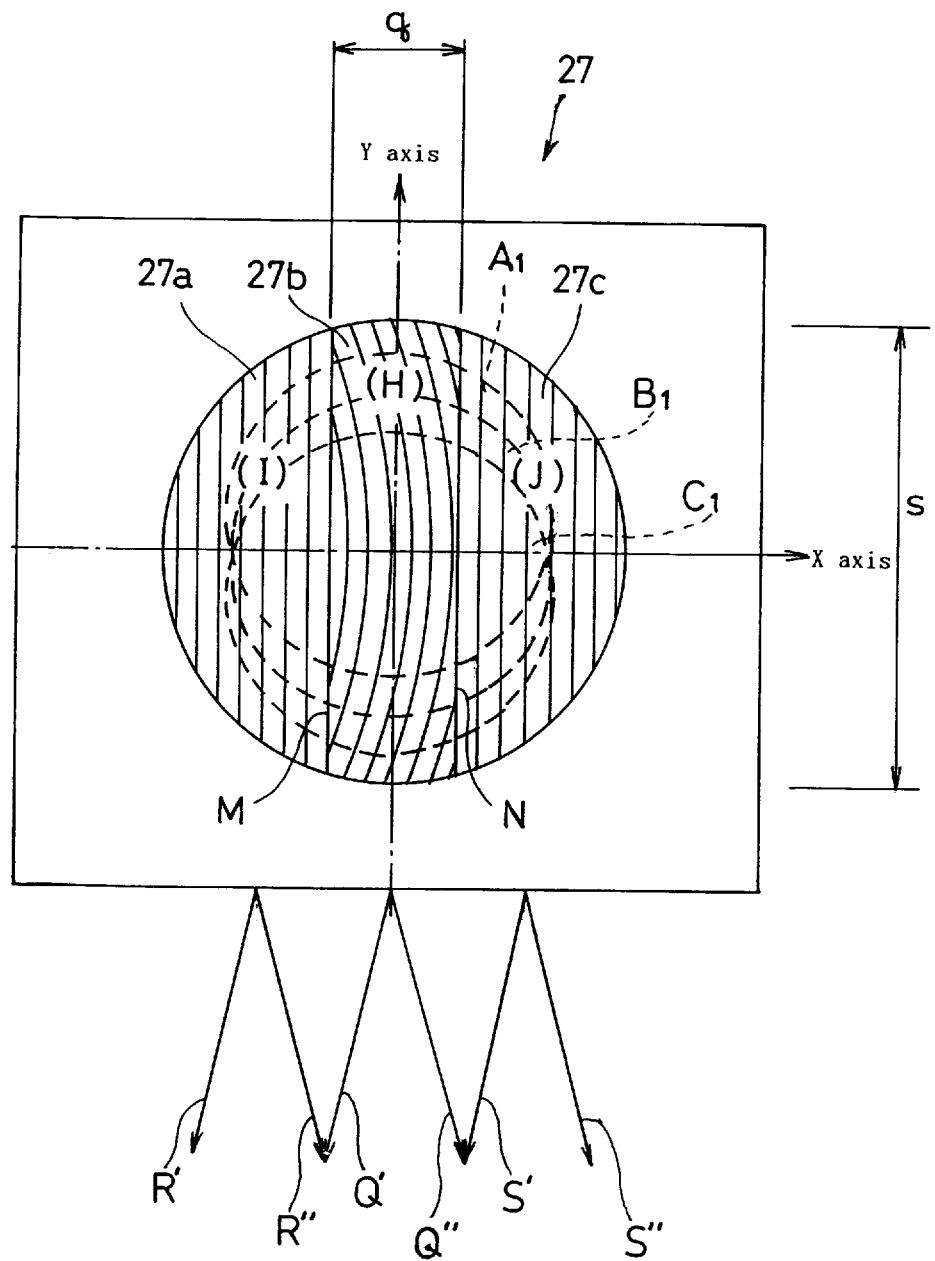
FIG. 14 is a front elevational view of a hologram plate according to the present invention.

Namely, as shown in FIG. 14, the hologram plate 27 defines a circular shape together with the second right and left areas J and I which are located on opposite sides of the center longitudinal hologram area H and which are provided with simple linear diffraction elements 27c and 27a. The center hologram area H which extends in the direction of separation of light by the Wollaston prism (beam splitting means) 26 corresponding to the radial direction X of the magneto-optic recording disc 24, is only used as a defocusing diffraction element (non-circular element) 27b having a predetermined hologram pattern. The hologram pattern of the center area H is the same as that of the hologram plate 27', so that a predetermined amount of negative and positive defocus in the optical axis direction is provided to the split beams.

The separation lines (boundary lines) M and N between the defocusing diffraction element 27b and the linear diffraction elements 27a and 27c are straight lines extending in the radial direction X of the concentric recording tracks of the recording disc 24. The center area H, provided with the defocusing diffraction element 27b, has a width q in a direction (i.e., direction of the axis X in FIG. 14) corresponding to the tangential direction Y to the recording tracks of the recording disc 24, so that the width q is smaller than the width (length) s of the first area in a direction corresponding to the radial direction X (i.e., the axis Y in FIG. 14). Namely, the defocusing diffraction element 27b of the center area H is made of a non-circular element whose numerical aperture corresponding to the tangential direction Y to the recording tracks is smaller than the numerical aperture corresponding to the radial direction.

When the hologram plate 27 as constructed above is used, the beams are split as follows.

Namely, the incident bundles of light $A_1$, $B_1$ and $C_1$ are each split into ±1st-order diffraction bundles of light Q' and Q" by the defocusing diffraction element 27b of the center area H of the hologram plate 27. All the split bundles of light contain a predetermined amount of defocus. Consequently, three pairs of split bundles of light, i.e., upper, intermediate and lower bundles of light, each pair containing right and left bundles of light, are produced from the bundles of light $A_1$, $B_1$ and $C_1$ transmitted through the center area H of the hologram plate 27. The bundles of light $A_1$, $B_1$ and $C_1$ transmitted through the linear diffraction elements 27a and 27c of the second left and right areas I and J are also split into ±1st-order diffraction bundles of light R', R" and S', S", respectively. The split bundles of light R', R", S', S" contain no defocus.

Namely, the +1st-order diffraction lights Q' of the incident bundles of light- $A_1$, $B_1$ and $C_1$ split by the center area H of the hologram plate 27 are split into the bundles of light $A_2$ $B_2$ and $C_2$ and the —1st-order diffraction lights Q" of the incident bundles of light $A_1$, $B_1$ and $C_1$ split by the center area H of the hologram plate 27 are split into the bundles of light $A_2'$, $B_2'$ and $C_2'$. The split bundles of light $A_2$, $B_2$, $C_2$, $A_2'$, $B_2'$ and $C_2'$ that contain a predetermined amount of defocus are made incident upon the data signal light receiving element 31a, the servo-signal light receiving element 32a and the data signal light receiving element 33a, the data signal light receiving element 31b, the servo-signal light receiving element 32b and the data signal light receiving element 33b, respectively. The +1st-order diffraction lights R' of the incident bundles of light $A_1$, $B_1$ and $C_1$, split by the peripheral area I of the hologram plate 27 are split into the bundles of light $LA_2$, $LB_2$ and $LC_2$ having no defocus. The −1st-order diffraction lights R" of the incident bundles of light $A_1$, $B_1$ and $C_1$ split by the peripheral area I of the hologram plate 27 are split into the bundles of light $LA_2'$, $LB_2'$ and $LC_2'$ having no defocus.

The +1st-order diffraction lights S' of the incident bundles of light $A_1$, $B_1$ and $C_1$ split by the pheripheral area J of the hologram plate 27 are split into the bundles of light $LA_2$, $LB_2$ and $LC_2$ having no defocus. The −1st-order diffraction lights S" of the incident bundles of light $A_1$, $B_1$ and $C_1$ split by the peripheral area J of the hologram plate 27 are split into the bundles of light $LA_2'$, $LB_2'$ and $LC_2'$ having no defocus.

The corresponding portions of the +1st-order diffraction lights R' and S' are overlapped and are made incident as bundles of light $LA_2$ $LB_2$ and $LC_2$ upon the outer peripheral portion of the data light receiving element 31a, the space on the left side of the servo-signal light receiving element 32a in FIG. 15 and the outer peripheral portion of the data signal light receiving element 33a, respectively.

The corresponding portions of the −1st-order diffraction lights R" and S" are overlapped and are made incident as bundles of light $LA_2'$, $LB_2'$ and $LC_2'$ upon the outer peripheral portion of the data signal light receiving element 31a, the space on the right side of the servo-signal light receiving element 32a in FIG. 15 and the outer peripheral portion of the data light receiving element 33a, respectively.

Since the servo-signal light receiving elements 32a and 32b have a lateral width shorter than the lateral width of the other light receiving elements, the off-axis bundles of light $LB_2$, $LB_2'$ are not received by the servo-signal light receiving elements 32a and 32b. Moreover, the bundles of light $LA_2LC_2$ received by the data signal light receiving elements 31a and 33a and the bundles of light $LA_2'$ and $LC_2'$ received by the data signal light receiving elements 31b and 33b are merely used to supplement the quantity of light upon signal detection.

If the hologram plate 27 is provided, even if a single small lens is used for the condenser lens 28 of the signal detection system, little or no off-axis rays reach the optical sensors, so that an adverse influence on this servo-signal light receiving elements 32a and 32b due to the aberrations caused by the lens can be restricted. Consequently, a photomagnetic head apparatus having a uniaxial signal detection system in which little or no T/F crosstalk occurs and there is little or no adverse influence on the focus servo-control or the high-speed seeking operation can be obtained.

Figure 18:
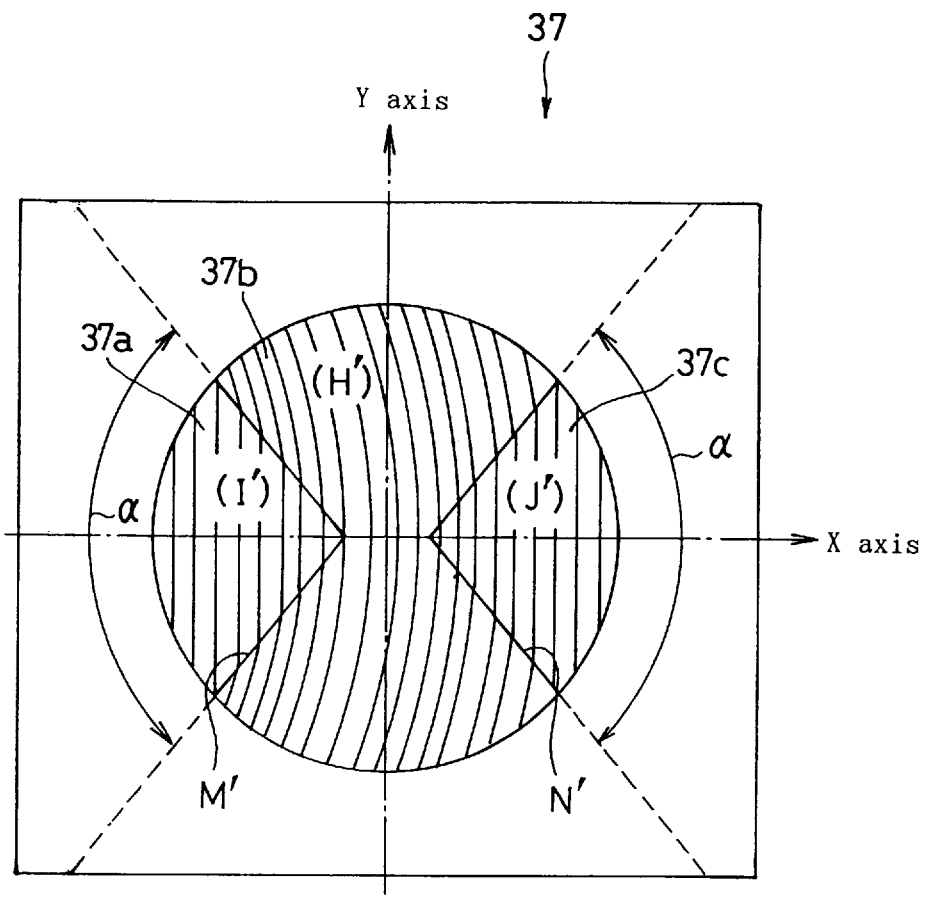
FIG. 18 is a front elevational view of another embodiment of a hologram plate according to the present invention; and, FIG. 19 is a perspective view of a main part of a photomagnetic head apparatus according to another embodiment of the present invention.

FIG. 18 shows another embodiment of a hologram plate 37. In FIG. 18, the hologram plate 37 is provided with a first (center) area H' and second (peripheral) areas I' and J' having shapes different from those of the hologram plate 27. Namely, the second areas I' and J' are sectorial and the first area H' is located between the second sector areas I' and J'. The boundary lines M' and N' between the defocusing diffraction element (non-circular element) 37b, corresponding to the first area H', and the linear diffraction elements 37a and 37c, corresponding to the second areas I' and J', are in the form of a generally V-shape which is symmetrical with respect to the tangential direction Y (axis Y in FIG. 18) of the concentric tracks of the recording disc 24. The apex angle α of the V-shape is, for example approximately 98°. The first area H' having the defocusing diffraction element 37b has a width in the direction (the X-axis direction in FIG. 18) corresponding to the tangential direction Y of the recording tracks, which width is smaller than the width (length) in the radial direction (Y-axis direction in FIG. 18). Namely, the defocusing diffraction element 37b of the first area H' is made of a non-circular element whose numerical aperture in the tangential direction Y of the recording tracks is smaller than the numerical aperture in the radial direction.

The incident light is split by the hologram plate 37 in substantially the same way as the splitting by the hologram plate 27. Consequently, in a photomagnetic head apparatus in which the hologram plate 37 is employed, an adverse influence on the servo-signal light receiving elements due to the aberrations caused by the condenser lens can be restricted. Thus, little or no T/F crosstalk occurs and there is little or no adverse influence on the focus servo-control or the high-speed seeking operation.

Figure 19:
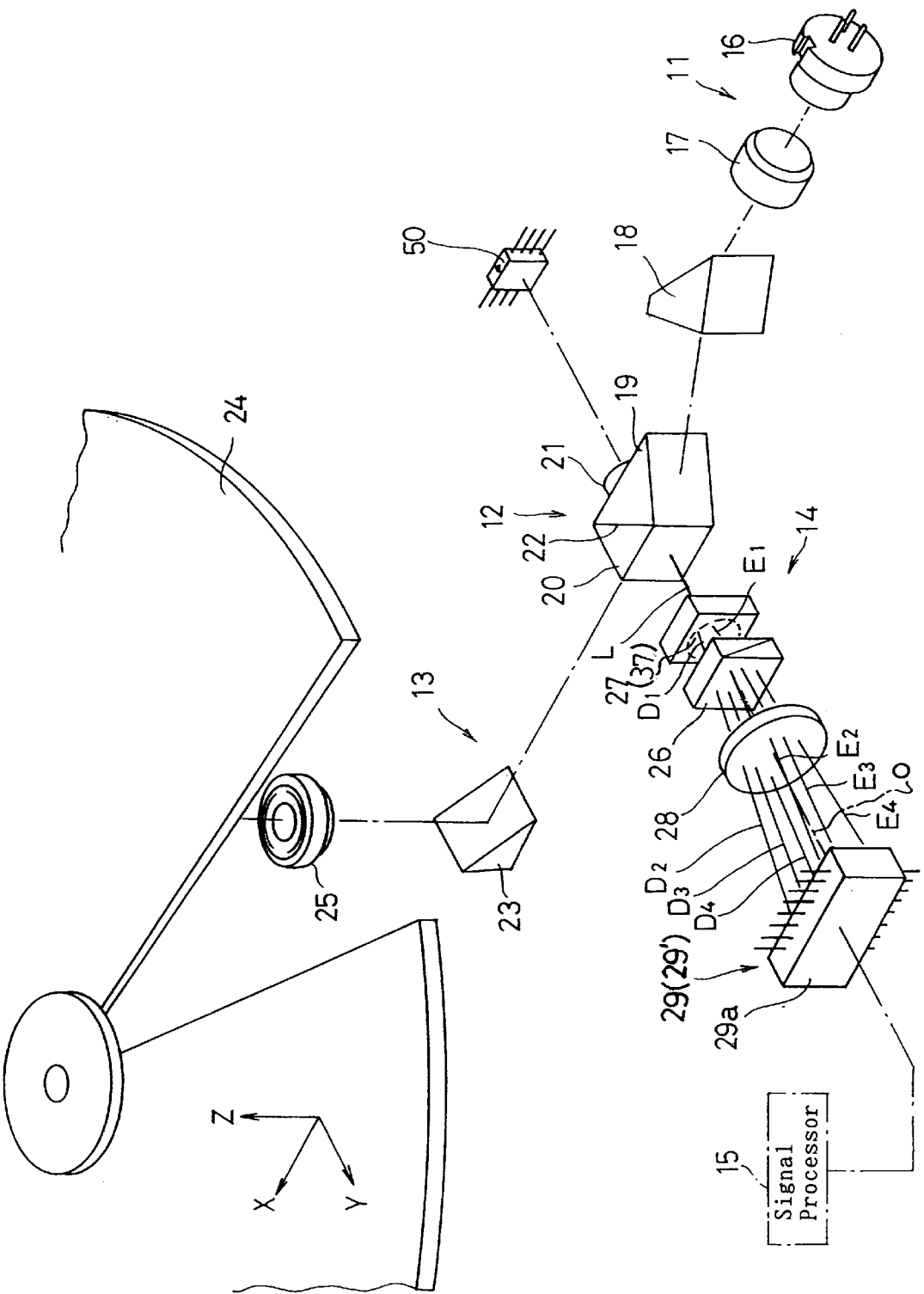

Although the hologram plate 27 (37) is located behind the Wollaston prism 26 and in the optical path thereof in the arrangement illustrated in FIG. 1, a similar effect can be obtained in a modified arrangement as shown in FIG. 19 in which the hologram plate 27 (37) is provided in front of the Wollaston prism 26. Note that in the arrangement shown in FIG. 19, the laser beam L reflected from the recording disc 24 is split into two bundles of light $D_1$, $E_1$ by the hologram plate 27 (37), and each of the two bundles of light $D_1$ and $E_1$ is thereafter split into three bundles of light $D_2$, $D_3$, $D_4$ and $E_2$, $E_3$ and $E_4$ by the Wollaston prism 26. The remaining structure shown in FIG. 19 is the same as that shown in FIG. 1.

As can be understood from the above discussion, according to the present invention, in a photomagnetic head apparatus having a uniaxial signal detection system in which a condenser lens is made of a single small lens, an adverse influence due to aberrations caused by the condenser lens can be restricted. Consequently, little or no T/F crosstalk occurs and there is little or no adverse influence on the focus servo-control or the high-speed seeking operation.

What is claimed is:

1. A photomagnetic head apparatus, comprising:
   a beam splitting assembly which splits a laser beam reflected by concentric recording tracks of a rotated photomagnetic recording disc into three bundles of rays having different polarization directions in a plane which lies in a radial direction of said recording tracks, one of said three bundles of rays being for a servo-signal light and the remaining two bundles of rays being for data signal lights;
   a defocusing diffraction element which splits said servo-signal light into at least two bundles of rays in a direction corresponding to a tangential direction of said recording tracks, substantially perpendicular to a splitting direction of said beam splitting assembly and which provides at least two split lights with a predetermined amount of one of a positive defocus and a negative defocus in an optical axis direction; and
   a pair of servo-signal light receiving elements which receive said split beams of said servo-signal light produced by said defocusing diffraction element,
   wherein said defocusing diffraction element is made of a non-circular element with a numerical aperture corresponding to said tangential direction of said recording tracks being smaller than a numerical aperture corresponding to said radial direction of said recording tracks to reduce detection of off-axis servo-signal light.

2. A photomagnetic head apparatus according to claim 1, wherein said defocusing diffraction element has a width in said tangential direction of said recording tracks smaller than a width in said radial direction of said recording tracks.

3. A photomagnetic head apparatus according to claim 1, further comprising data light receiving elements which receive said data signal lights, and wherein said defocusing diffraction element defines a substantially circular shape together with a linear diffraction element, so that light transmitted through said linear diffraction element can be received by said data light receiving element without being made incident upon said servo-signal light receiving elements.

4. A photomagnetic head apparatus according to claim 3, wherein two linear diffraction elements are located on opposite sides of said defocusing diffraction element and connected to said defocusing diffraction element at straight separation lines which extend in said radial direction of said recording tracks.

5. A photomagnetic head apparatus according to claim 3, wherein two linear diffraction elements are located on opposite sides of said defocusing diffraction element and connected to said defocusing diffraction element at V-shaped separation lines which are symmetrical with respect to said tangential direction of said recording tracks.

6. A photomagnetic head apparatus according to claim 1, wherein said- beam splitting assembly comprises a birefringent polarization element.

7. A photomagnetic head apparatus according to claim 1, wherein said defocusing diffraction element comprises a non-polarization phase hologram element.

8. A photomagnetic head apparatus according to claim 1, wherein said beam splitting assembly comprises a Wollaston prism.

9. A photomagnetic head apparatus according to claim 1, wherein said defocusing diffraction element comprises a phase type hologram element having no polarization property.

10. A photomagnetic head apparatus, comprising:

a beam splitting assembly which splits a laser beam reflected by concentric recording tracks of a rotated photomagnetic recording disc into three bundles of rays having different polarization directions in a plane which lies in a radial direction of said recording tracks, one of said three bundles of rays being for a servo-signal light and the remaining two bundles of rays being for data signal lights;

a non-circular defocusing diffraction element which splits said servo-signal light into a least two bundles of rays in a direction corresponding to a tangential direction of said recording tracks, substantially perpendicular to a splitting direction of said beam splitting assembly and which provides at least two split lights with a predetermined amount of one of a positive defocus and a negative defocus in an optical axis direction, said defocusing diffraction element defining a substantially circular shape together with a linear diffraction element;

a pair of servo-signal light receiving elements which receive said split beams of said servo-signal light produced by said defocusing diffraction element;

data signal light receiving elements which receive said data signal lights; and a condenser lens which gathers said servo-signal light and said data signal light onto said servo-signal light receiving elements and said data signal light receiving elements, wherein said servo-signal light receiving elements and said data signal light receiving elements are arranged such that light transmitted through and split by said linear diffraction element is received by said data signal light receiving elements without being made incident upon said servo-signal light receiving elements, a detection of off-axis servo-signal light being reduced by having a numerical aperture in said non-circular diffraction element corresponding to said tangential direction of said recording tracks being smaller than a numerical aperture in said non-circular diffraction element corresponding to said radial direction of said recording tracks.

11. A photomagnetic head apparatus according to claim 10, wherein the shape of said data signal light receiving elements are elongated in a direction corresponding to said radial direction of said recording tracks compared with said servo-signal light receiving elements.

12. A photomagnetic head apparatus according to claim 11, wherein all data signal light split by said beam splitting assembly, said defocusing diffraction element and said linear diffraction element is made incident upon said data signal light receiving elements, and wherein said servo-signal light split by said beam splitting assembly and said defocusing diffraction element is made incident upon said servo-signal light receiving elements, and further wherein servo-signal light split by said beam splitting assembly and said linear diffraction element is not made incident upon said servo-signal light receiving elements.

13. A photomagnetic head apparatus according to claim 10, wherein said beam splitting assembly comprises a Wollaston prism.

14. A photomagnetic head apparatus according to claim 10, wherein said defocusing diffraction element comprises a phase type hologram element having no polarization property.

* * * * *